United States Patent Office 3,433,073
Patented Mar. 18, 1969

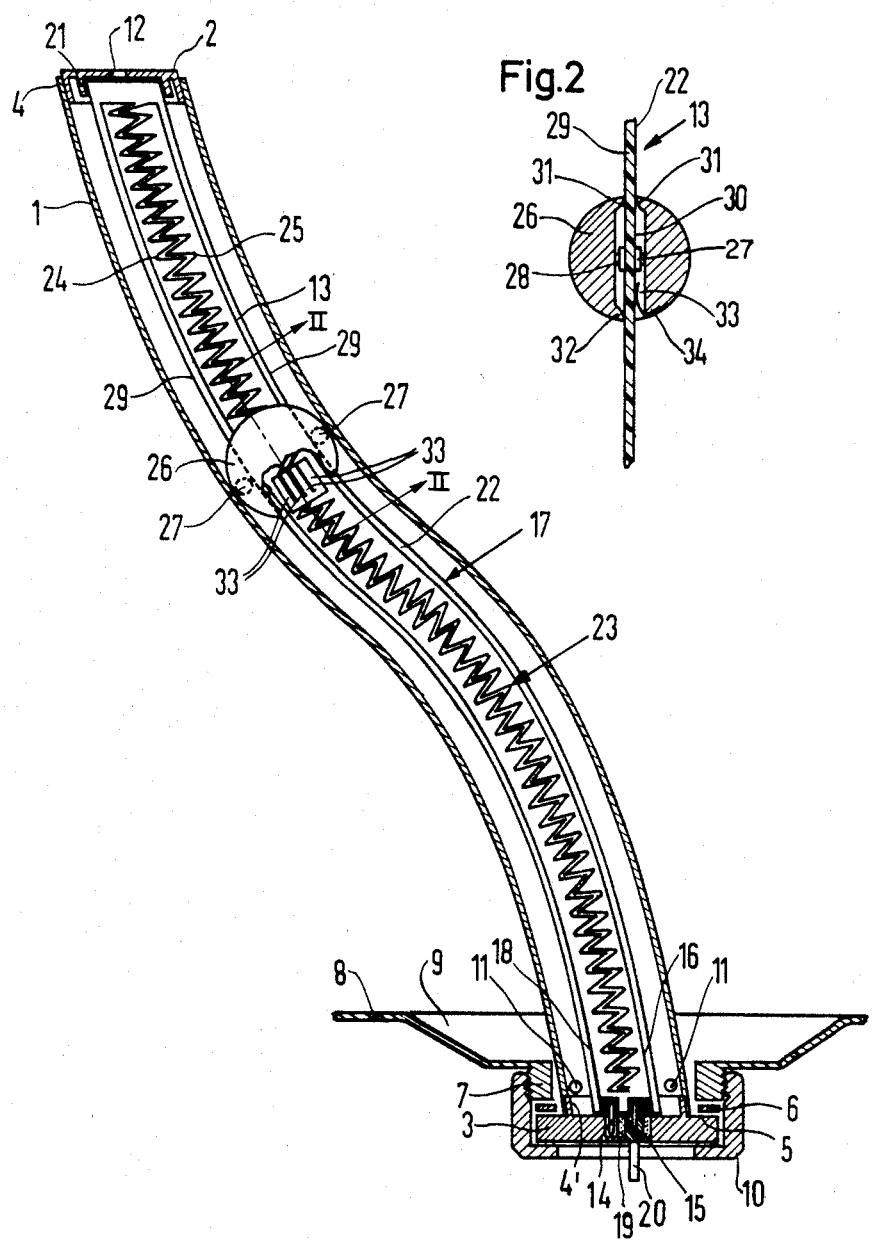

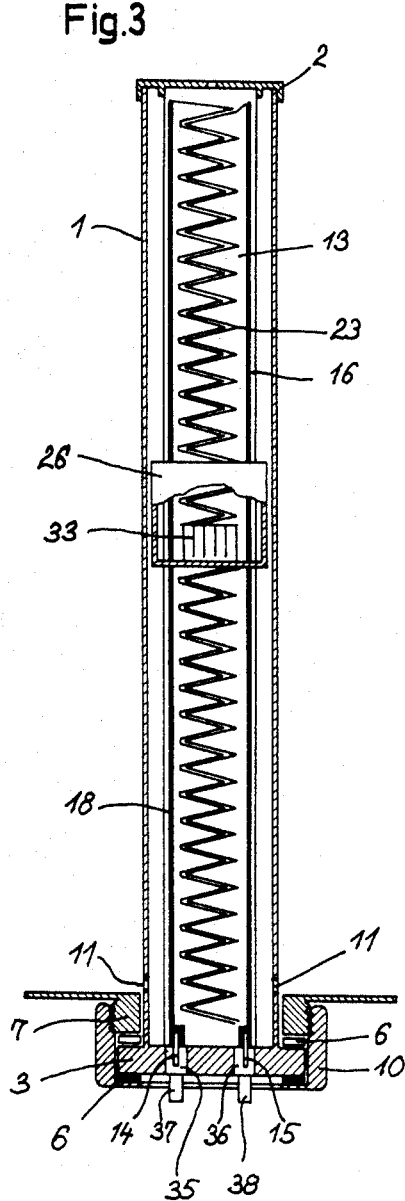
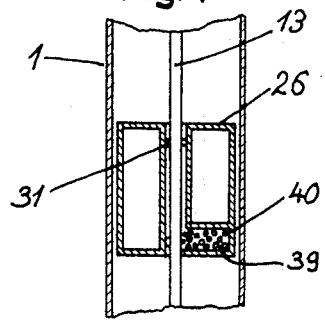

3,433,073
FLUID LEVEL MEASURING DEVICE
Werner Kunert, 4 Ortsstrasse, 6361 Grund-Schwalheim, uber Friedberg, Hesse, Germany
Filed Dec. 1, 1966, Ser. No. 598,244
Claims priority, application Germany, Dec. 2, 1965, K 57,811; July 15, 1966, B 88,023
U.S. Cl. 73—313                                                    15 Claims
Int. Cl. G01f 23/10

ABSTRACT OF THE DISCLOSURE

A device for measuring a fluid contained in a tank having a communicating tube extending into the tank from a flange connected to the tank by a cap. A guide rod is provided and is positioned internally of the communicating tube and has a float thereon which is movable up and down as a function of the fluid level in the tank. The float has means by which portions of a resistance loop are connected together so that the resistance of the resistance loop varies as a function of the position of the float on the guide rod.

---

This invention relates to a device for measuring a fluid contained in a tank, preferably gasoline in a tank of a motor vehicle, comprising a communicating tube extending into the tank from a flange which is connected with the tank and furthermore comprising a float which moves up and down in response to the fluid level and which is guided by a rod within the tube, said float shorting by means of contacts resistive conductors extending approximately the full length of the tube.

In the known devices of this type the guide rod is secured in the tube in form of a tube having a circular cross section. In the annular gap between the tube walls and the guide rod two resistive wires are arranged which form the resistive element and which extend between the end closures of the tube. Each wire is tapped by contacts arranged in the float. However, the accuracy of such devices is not sufficient. The length of the resistive element is very limited, the resistive wires cannot be of a sufficiently wide range of diameters because this would shorten the life of the device and tapping by means of the conveniently available contacts would be too difficult. Therefore only slight resistive differenecs are obtained at varying fluid levels which are not sufficient for exact indication. Furthermore, construction of said devices is complicated and their manufacturing is expensive. For example the costs for the resistive wire are very high because said wire must be drawn with as smooth a surface as possible to minimize friction between the wires and the tapping contacts which, in view of the very small current conducting surfaces, must tap the resistive wires with a considerable pressure.

It is the purpose of this invention to construct a device of the afore-discussed type in such a manner that a simple construction of the device, disregarding the shape of the tank, guarantees a high indicating accuracy.

To attain said purpose, the invention provides that the rod guiding the float is also used as carrier for the resistive element by making the rod of an electrically insulative plastic with a surface onto which the resistive element is pressed in zigzag form as an outer layer; or if desired, it may be applied in a different manner.

By this measure the length of the resistive element can be increased greatly and tapping of same can be improved appreciably inasmuch as only a little contact pressure is needed. Construction of the device is very simple and assures an almost unlimited lifetime. Furthermore, friction between the float and the guide rod is small because of the small friction coefficient of smooth plastic and also because of the fact that a considerable lubricating action can often be achieved by low viscosity fluids on plastics.

Contrary to the previously known devices, the measuring accuracy can be further improved, for example in the reserve area of the tank, by having differing spacings between the zigzag elements, and particularly by having very small spacings in the reserve area. However, a linear indication can also be obtained by means of differing spacings for irregularly shaped tanks. Such an expanding of the measuring area can also be achieved by varying the thickness of the zigzag wires.

In some cases a straight tube, because of the specific shape of the tank, cannot be used. According to the invention said difficulty can be overcome by curving the plastic rod as required.

To decrease the friction between the float and the guide rod, the plastic rod can be rectangular in cross section whereby the small surfaces of the rod are used as a guide for the float. Said measure is especially advantageous for a plastic rod which is curved along its longitudinal axis.

If desired, the friction can be still further decreased if the float is provided with rollers or slide elements acting along the narrow surfaces of the plastic rod.

To decrease also the friction of the tapping contacts on the resistive element, it is advantageous if the float is provided with a row of tongue-shaped contacts arranged side-by-side and said contacts are constructed as curved leaf springs.

The friction between the float and guide rod can be further decreased by providing a slotted hole in the float to receive the rod and by providing the opposing hole surfaces with projections which slide along the wide surfaces of the rod. In this connection it is especially favorable when pathways are provided on both sides of the zigzag element extending approximately the length of the rod, and when the projections which extend from the hole surfaces of the float slide on said pathways.

Friction between the float and the guide rod or the resistive element is therefore very important because the size of the float depends thereon. The buoyancy of the gasoline considering its small specific gravity is relatively small. If a considerable frictional force between the float and the guide rod or the resistive element cannot be prevented, the float must be kept relatively large to achieve sufficient lifting force. Such a large float, of course, requires a large tube diameter. The presently known devices, in which a high friction between the float and the guide rod or resistive element is unavoidable, consequently, have a tube diameter of as much as 48 mm.

The special advantages of the device according to the invention make it possible for the first time to make the tube with a relatively narrow diameter for example about 20 mm., and to secure the tube with its connecting flange at the bottom of the tank.

The diameter of the tube determines, of course, also the diameter of the connecting flange. If the diameter of the connecting flange is large, a safe sealing between connecting flange and bottom of the tank cannot be obtained, at least not for fluids like gasoline. Consequently the presently known tube devices have all been inserted from above into the tanks of motor vehicles. This has the disadvantage that said devices cannot measure all the way to the bottom of the tank but only to within about 20 mm. of same. In addition there is the disadvantage that for safety reasons each tank of a motor vehicle must be pressed outwardly. The tank is thereby bellied so that a permanent deformation is effected. Thus, the distance between the lower end of the tube which is inserted from above and the bottom of the tank is thereby increased. These are the reasons that the known tube measuring devices show considerable measuring mistakes especially in the area of measuring residual amounts.

All these difficulties are overcome if the tube, according to the invention, is inserted into the tank from below.

A further possibility arises thereby that the connecting flange of the tube is mounted to the bottom of the tank in the area of a mud pan. The residual amount can then practically be measured and indicated to the last liter.

The drawing illustrates schematically embodiments of the subject matter of the application, whereby FIGURE 1 is a central-sectional view of a device extending into the tank from below wherein the tube is of a curved shape, FIGURE 2 is a sectional view taken along the line II—II in FIGURE 1, FIGURE 3 is a central-sectional view of a modified device embodying the invention, and FIGURE 4 is a side elevational view of the guide rod with a cut float.

As illustrated in FIGURE 1, the device comprises a tube 1 which is closed by a flanged closure 2 on the upper end and by a flanged closure 3 on the lower end. The upper closure 2 is inserted into the tube by means of a guide and sealing ring 4. The lower closure 3 engages in the same manner with the tube 1 by a guide and sealing ring 4'. The lower flanged closure 3 has a diameter of a size that an annular sealing surface 5 is obtained which abuts against a threaded ring 7 after the interposition of a gasket 6. Said threaded ring 7 is affixed at the bottom 8 of the tank in a mud pan 9. The lower flanged closure 3 is held by means of a cap 10. A sufficiently strong connection between the fastening and sealing ring 4 and the lower end of the tube 1 can take place in a known manner for example by rolling, pressing or welding.

Closely above the lower flanged closure 3, several holes 11 are provided in the wall of the tube 1, which holes allow the fluid to flow in or out of the tube. A hole 12 is provided in the upper flanged closure 2 of the tube 1, through which hole air can flow in and out. This results in a known manner in a damping of the change of the fluid level in the tube.

A rod 13 with a rectangular cross-sectional shape is arranged inside the tube. Said rod is made of plastic which is electrically nonconductive and which will not be attacked by gasoline or other fluids to be handled and which has good sliding characteristics. Two contact pins 14 and 15 are rigidly inserted and insulated from each other in the lower end of said rod 13. The contact pin 15 is electrically connected to one end 16 of the resistive element 17 while the contact pin 14 is electrically connected to the other end 18 of the resistive element 17.

The contact 14 is connected to the grounded cable of the electric battery by the flanged closure 3 and the iron parts of the motor vehicle. The contact pin 15, on the other hand, is electrically insulated with respect to the fastening flanged closure 3 by means of an insulative ring 19. Said contact pin is electrically connected to a knifeswitch prong 20 which extends outwardly.

The upper flanged closure 2 comprises inwardly extending mounting supports 21 for the guide rod 13. The lower end of the guide rod is held immovably in the flanged closure 3 by the pins 14 and 15.

The guide rod 13 is made of an electrically insulative material such as plastic which cannot be corroded by gasoline, benzol and oils and is heat-resistant so that the temperatures occurring in the gas tank of a motor vehicle cannot cause a distortion of the guide rod. The guide rod in the illustrated example has a rectangular cross section (indicated in dash-dotted lines in FIGURE 2) and is curved in its main plane like the tube 1. Said tube can preferably be made of metal, however, it can also be made of a sufficiently rigid material, such as plastic.

Such a curved shape of the pipe and the rod allows the gas tank to have an irregular, stepped, construction which sometimes is specially advantageous for reasons of space, especially if the gas tank must be provided in the area of the trunk of the vehicle.

On a broad side 22 of the guide rod 13 there is arranged a resistive element 23 which is a portion of the resistive element 17 and is connected to the mentioned conductors 16 and 18. The resistive element 23 comprises resistive wires 24 and 25 extending many times back and forth in directions transverse of the guide rod hereinafter referred to (including the claims) as a zigzag direction. The term "zigzag" is to also include a waveform progression characterized by rounded corners. Said resistive wires 24 and 25 and the conductors 16 and 18 consist of a resistive metal which is provided in thin layers so that the total resistive element projects a little above the surface 22 of the guide rod 13 and is itself also constructed in a planar manner.

The resistance value of the wires 24 and 25 can, if desired, be increased for certain areas, for example for the residual area at the bottom of the tank. This is possible by decreasing the width of the wires 24 and 25 in the residual area.

A far more effective change of the resistance value can be effected by having only a very small step of the zigzag wires 24 and 25 in those areas where the remainder of gasoline in the tank must be measured, so that in this area a relatively great length of the resistive wires can be achieved.

The change in step of the resistive wires 24 and 25 extending in a zigzag manner can also be used in cases where the gas tank has a bellied shape or where said tank is necked-down. By this, a linear indication can also be achieved for these shapes of tanks without requiring special preparations in the indicating instrument.

A float 26 is guided along the plastic rod 13, said float having the shape of a ball in the illustrated example through which a slotted hole 30 extends which is accommodated to the cross section of the guide rod 13. The float can in a known manner be constructed as a hollow member. It can also consist of plastic foam provided at its surface with a skin-like plastic coating. On both sides of the guide rod 13, a guide roller 27 is arranged rotatably on an axle 28 in the float 26. The guide rollers 27 roll on the tracks 29 provided by the narrow edges of the rod 13 so that up and down movement of the float can not be hindered by a curved guide rod. However, the guide rollers 27 can be replaced by fixed guides if desired.

The float 26 can consist of a one-part or two-part construction as desired. If two-part, said parts are connected according to the illustrated embodiment by axles 28 and if necessary by further bridges. The float 26 has projections 31 and 32 in the hole 30 for further easing the moving of the float on the guide rod.

Opposite the projections 32 a number of tongue-shaped contacts 33 are arranged in form of curved leaf springs, which are secured to the float 26 at their angled ends 34. The contact pressure of these springs 33 can be maintained very small because the current passage does not take place on one line but on a relatively large surface. By this, the friction between the spring contacts 33 and the zigzag-shaped resistive wires 24 and 25 which define a resistance loop is lessened considerably. The curved shape of the spring contacts 33 has also a favorable effect in this connection since this will further reduce the friction.

To prevent projections 31 of the float 26 which contact the surface 22 from sliding on the resistive wires 24 and 25, said projections 31 can be so arranged to contact only the part of the surface 22 which is free from conductors 16 and 18 and from resistive wires 24 and 25.

Reduction of frictional forces between the float and the guide rod is of considerable importance because said reduction allows the use of a relatively small float and also of a tube of small diameter. This makes it possible to insert the tube, as illustrated, into the bottom of the tank and to allow the tube to extend freely into the tank from below. The remaining fuel in the tank is thus measured reliably in spite of a possible change of shape of the tank as a result of pressure variations. Since relatively high resistance values can be provided in this area due to the zigzag wires 24 and 25 which can extend in this area in a very small step, or which can have the thickness of a very thin line, a very exact measuring is obtained in said area because relatively small changes in the position of the float 26 effect a very accurately measurable resistance change of the resistive element.

It furthermore must be stressed that the production and the installation of such a measuring device is remarkably simple because said device is comprised of relatively few parts which can be assembled easily into a complete device. The connections to the conductors 16 and 18 are also not difficult. The connection places can be constructed as relatively wide contact surfaces. In addition to the illustrated example, it is also possible to provide clamps in the area of said connection surfaces which clamps are used at the same time as connection to the closure 3.

The tube 1 is actually not needed because the guide rod 13 carries and guides all parts of the device which are needed for measuring. However, noticeable variations of the fuel occur in the tanks of motor vehicles during their driving (driving of curves, driving over ground irregularities), so that it is desirable to damp said fast variations of the fuel by means of the tube 1.

The device according to FIGURE 3 has essentially the same characteristics as that above described and illustrated in FIGURE 1.

A difference is that the tube 1 and the rod 13 are not curved but straight. Moreover, the contact pins 14 and 15 engage, in this case, with insulated contact bushings 35 and 36, each of which is in connection with one outwardly projecting connection contact 37 and 38.

FIGURE 4 illustrates a further float construction. The cylindrically constructed float 26 is hollow. One of the hollow spaces forms a cage 39 which is open toward the rod 13. Contact members 40 are arranged in this cage 39, preferably in the shape of little metal balls, which short the resistive element 23. This way it is possible to further decrease the friction between the resistive wire and the contacts.

Although a particular preferred embodiment of the invention has been disclosed above in detail for illustrative purposes, it will be recognized that variations or modifications of such disclosure are fully contemplated.

The embodiments of the invention in which an exclusive property or privilege is claimed are defined as follows.

I claim:

1. A device for measuring a fluid contained in a tank having at least one opening therein, comprising:
   elongated insulative guide rod means securable to said tank and extending into said tank through said at least one opening, said guide rod means having a rectangular-shaped cross section defining a pair of wide side surfaces and a pair of narrow edge surfaces;
   resistive conductor means comprising at least a pair of elongated, thin layers of electrically conductive material secured to said guide rod means on at least one of said wide side surfaces and extending closely parallel to each other in a zigzag pattern along the length of said guide rod means;
   float means guided for longitudinal movement along said guide rod means and buoyant to said fluid in said tank, said float means having means defining an opening therethrough for slidably receiving said guide rod means, said float means having means engageable with said narrow edge surfaces for guiding said float means along said guide rod means, said float means having further means engageable with said at least one of said wide surfaces on said guide rod means for connecting said pair of elongated, thin layers of electrically conductive material together to define a resistance loop whereby the resistance of said resistance loop varies as a function of the position of said float on said guide rod means.

2. A device for measuring a fluid contained in a tank having at least one opening therein, comprising:
   flange means securable to said tank adjacent said at least one opening;
   elongated tubular means connected to said flange means and extending into said tank through said at least one opening;
   an elongated guide rod positioned internally of said tubular means and extending lengthwise thereof;
   resistive conductor means comprising at least a pair of elongated, thin layers of electrically conductive material secured to said guide rod and extending closely parallel to each other in a zigzag pattern along the length of said guide rod;
   float means guided for longitudinal movement along said guide rod and buoyant to said fluid in said tank and having means thereon for connecting said pair of elongated thin layers together to define a resistance loop whereby the resistance of said resistance loop varies as a function of the position of said float on said guide rod.

3. The device defined in claim 2, wherein said guide rod is made of an electrically insulative plastic and has a surface onto which is applied the thin layers of conductive material.

4. The device defined in claim 3, wherein the plastic guide rod is curved in its main plane to fit irregular tank shapes.

5. The device defined in claim 4, wherein the plastic guide rod comprises a rectangular cross section having a pair of broad sides and a pair of narrow edges and that the narrow edges of the guide rod define guide surfaces for the float.

6. The device defined in claim 5, wherein the float means is provided with roller members which engage the guide surfaces on the guide rod.

7. The device defined in claim 5, wherein the float means is provided with slide members which slidingly engage the guide surfaces on the guide rod.

8. The device defined in claim 5, wherein the float means has a slotted hole therethrough which receives the guide rod and that the float means has projections in the slotted hole to slidingly engage the broad sides of the guide rod.

9. The device defined in claim 5, wherein the spacing on at least one of the broad sides between the resistive conductor means and the narrow edges define narrow pathways extending the full length of the rod and that the projections on the internal surfaces of the slotted holes of the float slidingly engage the broad sides along said pathways.

10. The device defined in claim 9, wherein said tank has a mud pan in the bottom thereof and the flange means is fastened to the tank bottom in the area of the mud pan.

11. The device defined in claim 2, wherein the float means comprises contact members comprising a plurality of current conducting balls to short the resistive conductor means, said balls being provided in a cage-like hollow space in the float.

12. The device defined in claim 2, wherein said at least one opening is located in the bottom of said tank and the tubular means has a diameter about 20 mm. which is slightly less than the diameter of said at least one opening, said tubular means being connected to said flange means having a diameter slightly greater than said opening and extending upwardly into the tank through said at least one opening.

13. The device defined in claim 2, wherein the zigzag conductive material has various widths.

14. The device defined in claim 2, wherein the spacing between the zigzag layers of conductive material varies along the length of said guide rod.

15. The device defined in claim 2, wherein the float means is provided with a plurality of side-by-side curved leaf spring contacts of electrically conductive material engaging said at least a pair of thin layers of conductive material.

References Cited

UNITED STATES PATENTS

| 409,135 | 8/1889 | Bentley | 338—293 X |
| 851,440 | 4/1907 | Rivers | 338—292 X |
| 2,484,690 | 10/1949 | De Giers | 73—313 X |
| 2,592,929 | 4/1952 | Matchett | 73—313 |
| 3,113,282 | 12/1963 | Coleman | 338—33 |
| 3,266,661 | 8/1966 | Dates | 338—283 X |

LOUIS R. PRINCE, *Primary Examiner.*

D. M. YASICH, *Assistant Examiner.*

U.S. Cl. X.R.

338—33; 350—285, 286